(12) United States Patent
Ikeda et al.

(10) Patent No.: US 8,628,713 B1
(45) Date of Patent: Jan. 14, 2014

(54) INORGANIC BOARD AND METHOD FOR MANUFACTURING INORGANIC BOARD

(71) Applicant: Nichiha Corporation, Nagoya (JP)

(72) Inventors: Satoshi Ikeda, Nagoya (JP); Yusuke Omori, Nagoya (JP)

(73) Assignee: Nichiha Corporation, Nagoya-Shi (JP)

( * ) Notice: Subject to any disclaimer, the term of this patent is extended or adjusted under 35 U.S.C. 154(b) by 0 days.

(21) Appl. No.: 13/785,148

(22) Filed: Mar. 5, 2013

(30) Foreign Application Priority Data

Jun. 29, 2012 (JP) ................................. 2012-146826

(51) Int. Cl.
| | |
|---|---|
| *B28B 3/00* | (2006.01) |
| *B27N 3/00* | (2006.01) |
| *B27N 3/04* | (2006.01) |
| *B27N 3/08* | (2006.01) |
| *B27N 3/10* | (2006.01) |
| *C04B 14/38* | (2006.01) |
| *C04B 22/00* | (2006.01) |
| *C04B 24/10* | (2006.01) |

(52) U.S. Cl.
USPC ........... 264/319; 106/609; 106/691; 106/696; 106/698; 106/708; 106/711; 106/716; 106/731; 106/737; 106/780; 106/782; 106/788; 106/789; 106/790; 106/801; 106/805; 106/814; 106/819; 264/333; 264/640

(58) Field of Classification Search
USPC ......... 106/609, 691, 696, 698, 708, 711, 716, 106/731, 737, 780, 782, 788, 789, 790, 801, 106/805, 814, 819; 264/319, 333, 640
See application file for complete search history.

(56) References Cited

U.S. PATENT DOCUMENTS 4,377,415 A * 3/1983 Johnson et al. .................... 524/4
6,869,475 B1 * 3/2005 Krowl ........................... 106/797

FOREIGN PATENT DOCUMENTS

| JP | 7-166644 A | | 6/1995 |
| JP | 2000-301511 A | | 10/2000 |
| JP | 2012-116685 A | * | 6/2012 |
| WO | WO2008/138925 A1 | * | 11/2008 |

OTHER PUBLICATIONS

Derwent-Acc-No: 2007-377420, abstract of Chinese Patent Specification No. CN 1884180A (Dec. 2006).*
Derwent-Acc-No: 2006-534242, abstract of Korean Patent Specification No. KR 2005069430 A (May 2005).*
Derwent-Acc-No: 2009-E36846, abstract of Korean Patent Specification No. KR 855122 B1 (Aug. 2008).*

* cited by examiner

*Primary Examiner* — Anthony J Green
(74) *Attorney, Agent, or Firm* — Birch, Stewart, Kolasch & Birch, LLP

(57) ABSTRACT

An inorganic board contains, in a solid content ratio, 30 to 70 mass % of hydraulic material, 5 to 15 mass % of reinforcing fiber, and 1 to 30 mass % of wollastonite having a wet volume (after being allowed to stand for 30 minutes) of 15 to 45 ml. Also, a method includes: step of producing a slurry containing hydraulic material, reinforcing fiber, and wollastonite; step of producing a sheet by dehydrating the slurry; and step of pressing and curing the sheet; wherein, in the step of producing a slurry, a composition of the slurry is set so as to contain, in a solid content ratio, 30 to 70 mass % of hydraulic material, 5 to 15 mass % of reinforcing fiber, and 1 to 30 mass % of wollastonite having a wet volume (after being allowed to stand for 30 minutes) of 15 to 45 ml.

9 Claims, No Drawings

INORGANIC BOARD AND METHOD FOR MANUFACTURING INORGANIC BOARD

BACKGROUND OF THE INVENTION

1. Field of the Invention

The present invention relates to an inorganic board that is excellent in crack resistance and fire resistance and is preferably used as a building board, and a method for manufacturing the inorganic board.

2. Description of the Related Art

Conventionally, inorganic boards having excellent physical properties such as strength and having a good productivity have been manufactured by forming sheets using an apparatus such as a Hatschek sheet forming machine or a flow-on sheet forming machine from a slurry in which a hydraulic material is dispersed in water, and dehydrating and then curing the sheets. In order to improve physical properties of such inorganic boards, such as crack resistance, fire resistance, and dimensional stability, wollastonite is in some cases added to and mixed with the slurry.

For example, JP 2000-301511A discloses a method for manufacturing a fiber reinforced cement board, including the step of forming a sheet from a cement slurry, wherein wollastonite in an amount of 0.5 to 5 wt % with respect to the total solid content weight of the cement slurry is dispersed in a green sheet immediately after the supply thereof on a filter cloth, and the green sheet is then vibrated. However, since the performance of wollastonite exerted varies depending on the pulverization method or the classification method, wollastonite of a proper grade has to be used such that the inorganic board is made, for example, crack resistant, fire resistant, and dimensionally stable. Unless wollastonite of a proper grade is used, the flexural strength may be lowered, and the productivity may deteriorate due to water filtering characteristics and the like, for example.

JP H7-166644A discloses a fiber cement board, containing cement, a pulp fiber material, and an aggregate, and further containing an inorganic additive having an aspect ratio of 10 or more, wherein the inorganic additive is wollastonite. However, since wollastonite is in the form of needle-like crystals having various sizes, even when wollastonite has an aspect ratio of 10 or more, the inorganic board may not be, for example, crack resistant, fire resistant, or dimensionally stable, depending on the size distribution of the wollastonite. Furthermore, if wollastonite contains a large amount of fine crystals, the flexural strength may be lowered, and the productivity may deteriorate due to water filtering characteristics and the like. Accordingly, the aspect ratio is not reliable as a standard in selecting wollastonite.

SUMMARY OF THE INVENTION

It is an object of the present invention to provide an inorganic board that is excellent in crack resistance, fire resistance, dimensional stability, and productivity, and a method for manufacturing the inorganic board.

The present invention provides an inorganic board that is preferably used as a building board. The inorganic board of the present invention contains, in a solid content ratio, 30 to 70 mass % of hydraulic material, 5 to 15 mass % of reinforcing fiber, and 1 to 30 mass % of wollastonite having a wet volume (after being allowed to stand for 30 minutes) of 15 to 45 ml.

In the present invention, it is preferable that the wollastonite has a difference between a wet volume (after being allowed to stand for 15 minutes) and a wet volume (after being allowed to stand for 30 minutes) of less than 10%. Furthermore, in order to achieve an excellent productivity, it is preferable that the inorganic board is a cured mat obtained by dehydrating a slurry.

Furthermore, it is preferable that the inorganic board further contains 18 to 64 mass % of inorganic admixture. It is more preferable that at least one of mica, pearlite, coal ash, paper sludge ash, and magnesium hydroxide is contained as the inorganic admixture, and that at least one of waste paper and pulp is contained as the reinforcing fiber.

Also, the present invention provides a method for manufacturing an inorganic board. The manufacturing method of the present invention includes: a step of producing a slurry containing a hydraulic material, a reinforcing fiber, and wollastonite; a step of producing a sheet by dehydrating the obtained slurry; and a step of pressing and curing the obtained sheet; wherein, in the step of producing a slurry, a composition of the slurry is set so as to contain, in a solid content ratio, 30 to 70 mass % of hydraulic material, 5 to 15 mass % of reinforcing fiber, and 1 to 30 mass % of wollastonite having a wet volume (after being allowed to stand for 30 minutes) of 15 to 45 ml.

In the present invention, it is preferable that, in the step of producing a slurry, wollastonite having a difference between a wet volume (after being allowed to stand for 15 minutes) and a wet volume (after being allowed to stand for 30 minutes) of less than 10% is used.

It is preferable that, in the step of producing a slurry, the slurry is produced so as to further contain 18 to 64 mass % of inorganic admixture in a solid content ratio. It is more preferable that at least one of mica, pearlite, coal ash, paper sludge ash, and magnesium hydroxide is used as the inorganic admixture, and that at least one of waste paper and pulp is used as the reinforcing fiber.

The present invention can provide an inorganic board that is excellent in crack resistance, fire resistance, dimensional stability, and productivity, and a method for manufacturing the inorganic board.

DESCRIPTION OF THE PREFERRED EMBODIMENT

Hereinafter, an embodiment of the present invention will be specifically described.

An inorganic board of the present invention contains a hydraulic material, a reinforcing fiber, and wollastonite.

Examples of the hydraulic material include cement such as ordinary portland cement, high-early-strength portland cement, alumina cement, blast furnace cement, and fly ash cement, gypsum such as anhydrous gypsum, hemihydrate gypsum, and gypsum dihydrate, and slag such as blast furnace slag and converter slag. These materials may be used alone or in a combination of two or more.

Examples of the reinforcing fiber include wood reinforcing materials such as wood chip, bamboo chip, wood flour, waste paper, Nadelholz unbleached kraft pulp (NUKP), Nadelholz bleached kraft pulp (NBKP), Laubholz unbleached kraft pulp (LUKP), and Laubholz bleached kraft pulp (LBKP), synthetic fibers such as polyester fiber, polyamide fiber, acrylic fiber, polyvinylidene chloride fiber, acetate fiber, polypropylene fiber, polyethylene fiber, and vinylon fiber, and other fibers such as glass fiber, carbon fiber, ceramic fiber, and rock wool. These materials may be used alone or in a combination of two or more.

The wollastonite has a wet volume (after being allowed to stand for 30 minutes) of 15 to 45 ml. The wet volume (after being allowed to stand for 30 minutes) refers to the height of the bulk of wollastonite in water, measured in the conditions in which 15 g of wollastonite is placed in a 100 ml measuring cylinder (JIS R3505 standard product, inner diameter 28 mm, overall height 250 mm), and the cylinder is then filled with water, sealed, turned upside down 10 times or more, and, after it is observed that wollastonite has been dispersed in water, the cylinder is allowed to stand for 30 minutes. The wet volume (after being allowed to stand for 15 minutes) refers to the height of the bulk of wollastonite in water, measured in the conditions in which, after the cylinder is filled with water, sealed, and turned upside down in a similar manner, the cylinder is allowed to stand for 15 minutes.

Note that, if the wollastonite has a difference between the wet volume (after being allowed to stand for 15 minutes) and the wet volume (after being allowed to stand for 30 minutes) of less than 10%, the amount of fine crystals contained in the wollastonite is small, and, thus, filtering of water is hardly inhibited during slurry dehydration. Accordingly, an inorganic board that has an excellent productivity and that easily exhibits physical properties such as crack resistance and fire resistance is obtained, which is preferable.

Furthermore, the inorganic board of the present invention may further contain an inorganic admixture. Examples of the inorganic admixture include coal ash, paper sludge ash, pearlite, silica fume, mica, calcium carbonate, magnesium hydroxide, aluminum hydroxide, vermiculite, sepiolite, xonotlite, silica sand, silica stone powder, silica powder, diatomaceous earth, kaolinite, zeolite, and the like. These materials may be used alone or in a combination of two or more. In particular, the inorganic admixture preferably contains at least one of mica, pearlite, coal ash, paper sludge ash, and magnesium hydroxide.

Furthermore, the inorganic board of the present invention may further contain an inorganic composition. Examples of the inorganic composition include defective inorganic boards before or after curing generated in the manufacturing process, left-over or waste inorganic boards generated in the building site, and the like. All of these are used after being pulverized by an impact pulverizer and/or a grinding pulverizer. If the inorganic board contains the inorganic composition, the amount of industrial wastes can be reduced.

Furthermore, the inorganic board of the present invention may further contain a hardening accelerator such as calcium chloride, magnesium chloride, potassium sulfate, calcium sulfate, magnesium sulfate, aluminium sulfate, calcium formate, calcium acetate, and calcium acrylate, a powder of mineral such as bentonite, a water proof agent and a water repellent agent, such as tallow, wax, paraffin, silicone, and succinic acid or a metal salt of higher fatty acid, foam such as foamable thermoplastic plastic beads and plastic foam, aqueous starch adhesive such as polyvinyl alcohol and carboxymethylcellulose, and a strengthening agent such as styrene-butadiene latex, acrylic emulsion adhesive, and other synthetic resin emulsions.

The inorganic board of the present invention contains, in a solid content ratio, 30 to 70 mass % of hydraulic material, 5 to 15 mass % of reinforcing fiber, and 1 to 30 mass % of wollastonite having a wet volume (after being allowed to stand for 30 minutes) of 15 to 45 ml. The content of hydraulic material is set at 30 to 70 mass %, because, if the content is less than 30 mass %, the obtained inorganic board is not sufficiently strong, and, if the content is more than 70 mass %, the physical properties such as crack resistance or the productivity becomes poor. In the case of steam curing or natural curing, the content is preferably 40 to 70 mass %. The content of reinforcing fiber is set at 5 to 15 mass %, because, if the content is less than 5 mass %, the obtained inorganic board is not sufficiently strong, and, if the content is more than 15 mass %, the hardening effect becomes insufficient. The wet volume (after being allowed to stand for 30 minutes) of wollastonite is set at 15 to 45 ml, because, if the wet volume is less than 15 ml, the obtained inorganic board is not sufficiently crack resistant or fire resistant, and, if the wet volume is more than 45 ml, the productivity becomes poor. Furthermore, the content of such wollastonite is set at 1 to 30 mass %, because, if the content is less than 1 mass %, the obtained inorganic board cannot have the effect of the wollastonite, and, if the content is more than 30 mass %, the obtained inorganic board is not sufficiently strong.

The inorganic board of the present invention preferably contains 18 to 64 mass % of inorganic admixture. The content of inorganic admixture is set at 18 to 64 mass %, because, if the content is less than 18 mass %, the inorganic board cannot have the effect of the inorganic admixture, such as light weight and crack resistance, and, if the content is more than 64 mass %, the inorganic board may not be sufficiently strong.

A method for manufacturing an inorganic board of the present invention includes a step of producing a slurry containing the hydraulic material, the reinforcing fiber, and the wollastonite, a step of producing a sheet by dehydrating the obtained slurry, and a step of pressing and curing the obtained sheet.

In the step of producing a slurry, the slurry contains the hydraulic material, the reinforcing fiber, and the wollastonite. The slurry may be produced by mixing the hydraulic material, the reinforcing fiber, and the wollastonite in the form of powders (dry form) and then dispersing the mixture in water, or may be produced by separately dispersing each starting material in water and then mixing the dispersions.

Note that, in the present invention, wollastonite having a wet volume (after being allowed to stand for 30 minutes) of 15 to 45 ml is used. Furthermore, in the present invention, the composition of the slurry is set so as to contain, in a solid content ratio, 30 to 70 mass % of hydraulic material, 5 to 15 mass % of reinforcing fiber, and 1 to 30 mass % of wollastonite having a wet volume (after being allowed to stand for 30 minutes) of 15 to 45 ml. Accordingly, the obtained inorganic board is excellent in strength, crack resistance, and fire resistance, as well as productivity. If wollastonite having a difference between the wet volume (after being allowed to stand for 15 minutes) and the wet volume (after being allowed to stand for 30 minutes) of less than 10% is used, filtering of water is hardly inhibited during slurry dehydration. Accordingly, an inorganic board that has an excellent productivity and that easily exhibits physical properties such as crack resistance and fire resistance is obtained, which is preferable.

Furthermore, the slurry may further contain 18 to 64 mass % of inorganic admixture in a solid content ratio. Accordingly, the strength of the obtained inorganic board is not lowered, and the effect of the inorganic admixture, such as light weight and crack resistance, can be obtained.

Next, in the step of producing a sheet by dehydrating the obtained slurry, a sheet is produced by dehydrating the slurry using a sheet forming process or a molding process.

In the sheet forming process, a sheet is produced by separating the slurry into water and solid matter, using felt, wire mesh, or the like. Specifically, a sheet may be produced, for example, using a method for dehydrating the slurry by causing the slurry to flow on felt, or a method for dehydrating the slurry by combing the slurry using a circular wire mesh. Note that, the obtained formed sheet may be layered on another formed sheet, thereby forming a sheet laminate. Examples of the layering method include a method in which a plurality of apparatuses for forming sheets are arranged in the direction in which formed sheets are conveyed, and sheets formed by the respective apparatuses are layered, and a method in which a formed sheet is wound around a roll and thus layered, and the laminate is detached from the roll when a predetermined thickness is obtained. Note that, in the sheet forming process, the solid content concentration of the slurry before dehydration is adjusted to 20 mass % or less. The solid content concentration of the slurry is set at 20 mass % or less, because, if the solid content concentration is more than 20 mass %, it takes time to dehydrate the slurry, and cracks easily occur in the sheet formed through dehydration, and, thus, sheet forming becomes difficult, for example.

In the molding process, a sheet is produced by pouring the slurry into a mold whose lower side is provided with a suction extractor, and performing suction and dehydration from the lower side, thereby separating the slurry into water and solid matter. Note that, in the molding process, the solid content concentration of the slurry before dehydration is adjusted to 20 to 40 mass %. The solid content concentration of the slurry is set at 20 mass % or more, because, if the solid content concentration is less than 20 mass %, it takes time to dehydrate the slurry, and cracks easily occur in the dehydrated sheet, for example. The solid content concentration of the slurry is set at 40 mass % or less, because, if the solid content concentration is more than 40 mass %, the flowability of the slurry becomes poor, and cracks easily occur in the dehydrated sheet, for example.

Next, in the step of pressing and curing the obtained sheet, typically, the sheet is pressed at a pressure of 10 kg/cm$^2$ or more, and is then cured using a curing method such as natural curing, steam curing, or autoclave curing. At the time of pressing, a projection/depression pattern may be formed on the mat by placing a pattern-carved plate on the upper side or the lower side of the mat. Furthermore, steam curing is typically performed at 60 to 90° C. for 5 to 36 hours, and autoclave curing is typically performed at 150 to 200° C., at 0.5 MPa or more, for 7 to 15 hours. Furthermore, primary curing may be performed before the steam curing or the autoclave curing.

Next, examples of the present invention will be described.

Slurries having the solid content compositions shown in Table 1 were dehydrated by causing the slurries to flow on felt, obtained sheets were layered and steam-cured a 80° C., and, thus, inorganic boards of Examples 1 to and Comparative Examples 1 to 3 were manufactured. The wet volume of wollastonite was measured in the conditions in which 15 g of wollastonite was placed in a 100 ml measuring cylinder, and the cylinder was then filled with water, sealed, turned upside down 20 times, and, after wollastonite had been dispersed in water, the cylinder was allowed to stand for a predetermined period of time. Furthermore, all slurries had a solid content concentration of 14 mass %, and were pressed at 40 kg/cm$^2$ to a thickness of 14 mm.

The thus obtained inorganic boards of Examples 1 to 5 and Comparative Examples 1 to 3 were checked in terms of productivity, as well as absolute dry specific gravity, flexural strength, dimensional stability, coating adhesion, crack resistance, and shrinkage during combustion. Table 1 shows the results.

The productivity was tested as follows. 500 ml each of slurries used for manufacturing the respective inorganic boards were loaded into Buchner funnels in which a filter paper was placed on a filtering face, and dehydrated by reducing the pressure of a vacuum flask at a suction force of 0.2 MPa, and the time until dripping of water stopped was measured. If the time is more than 50 seconds, the result is indicated as "poor", if the time is 40 to 50 seconds, the result is indicated as "slightly poor", and, if the time is less than 40 seconds, the result is indicated as "good".

The flexural strength was tested as defined in JIS A 1408, except that inorganic boards each having a size of 7×20 cm were used as test samples. Furthermore, the test samples after the flexural strength measurement were loaded into a drier at 120° C., and the volume and the mass of the test samples when an equilibrium state was achieved were measured.

The dimensional stability was tested as follows, using inorganic boards each having a size of 7×20 cm as test samples. After the test samples were placed in an air-conditioned room at 20° C. and a humidity of 65% until an equilibrium state was achieved, the length of each test sample (taken as $l_1$) was

TABLE 1

| | | | Ex.1 | Ex.2 | Ex.3 | Ex.4 | Ex.5 | Com.Ex.1 | Com.Ex.2 | Com.Ex.3 |
|---|---|---|---|---|---|---|---|---|---|---|
| Slurry composition (Solid content) | Portland cement + slag | mass % | 40.0% | 50.0% | 50.0% | 50.0% | 60.0% | 50.0% | 50.0% | 30.0% |
| | Wollastonite A*[1] | mass % | | 5.0% | | | | | | |
| | Wollastonite B*[2] | mass % | 25.0% | | 5.0% | | 15.0% | | | 35.0% |
| | Wollastonite C*[3] | mass % | | | | 5.0% | | | | |
| | Wollastonite D*[4] | mass % | | | | | | | 5.0% | |
| | Fly ash (Coal ash) | mass % | 10.0% | 20.0% | 20.0% | 20.0% | 10.0% | 15.0% | 20.0% | 10.0% |
| | Paper sludge ash | mass % | 5.0% | 5.0% | 5.0% | 5.0% | 4.0% | 10.0% | 5.0% | 5.0% |
| | Pearlite | mass % | 5.0% | 5.0% | 5.0% | 5.0% | 4.0% | 10.0% | 5.0% | 5.0% |
| | Waste paper + NUKP | mass % | 10.0% | 10.0% | 10.0% | 10.0% | 7.0% | 10.0% | 10.0% | 10.0% |
| | Mica | mass % | 5.0% | 5.0% | 5.0% | 5.0% | 0.0% | 5.0% | 5.0% | 5.0% |
| | Sub total | mass % | 100.0% | 100.0% | 100.0% | 100.0% | 100.0% | 100.0% | 100.0% | 100.0% |
| Physical properties | Absolute dry specific gravity | — | 1.01 | 0.98 | 0.98 | 1.00 | 1.02 | 0.95 | 0.98 | 0.96 |
| | Flexural strength | N/mm$^2$ | 12.2 | 12.6 | 12.0 | 13.2 | 14.0 | 11.2 | 11.5 | 7.5 |
| | Productivity | — | Good | Good | Good | Good | Good | Good | Slightly poor | Good |
| | Dimensional stability | — | Excellent | Excellent | Excellent | Excellent | Excellent | Good | Good | Good |
| | Coating adhesion | — | Good | Good | Good | Good | Good | Good | Good | Good |
| | Crack resistance | — | Good | Good | Good | Good | Good | Slightly poor | Slightly poor | Good |
| | Shrinkage during combustion | — | Good | Slightly poor | Good | Good | Good | Poor | Poor | Good |

*[1] Wollastonite A has a wet volume (after being allowed to stand for 30 minutes) of 15 ml and a wet volume (after being allowed to stand for 15 minutes) of 20 ml.
*[2] Wollastonite B has a wet volume (after being allowed to stand for 30 minutes) of 30 ml and a wet volume (after being allowed to stand for 15 minutes) of 32 ml.
*[3] Wollastonite C has a wet volume (after being allowed to stand for 30 minutes) of 45 ml and a wet volume (after being allowed to stand for 15 minutes) of 50 ml.
*[4] Wollastonite D has a wet volume (after being allowed to stand for 30 minutes) of 10 ml.

measured. Then, after the test samples were immersed in water for 7 days, the test samples were taken out of water, water attached to the surface was removed with a cloth, and the length of each test sample (taken as $l_2$) was measured. Then, $(l_2-l_1)$ was divided by $l_1$ and then multiplied by 100, and the obtained value was evaluated using the value of Comparative Example 1 as a reference. If the obtained value is greater than the absolute value of Comparative Example 1, the result is indicated as "poor", if the obtained value is at least half the absolute value of Comparative Example 1 and at most that absolute value, the result is indicated as "good", and, if the obtained value is less than half the absolute value of Comparative Example 1, the result is indicated as "excellent".

The coating adhesion was tested as follows. Test samples were coated, and cuts were made thereon using a cutter knife at an interval of 2 mm to form a 25-square grid. Subsequently, an adhesive cellophane tape was applied to the surface and then removed, and the amount of coating adhering to the adhesive cellophane tape was checked. If the coating was removed in an amount corresponding to 4 or more squares, the result is indicated as "poor", if the coating was removed in an amount corresponding to 2 to 3 squares, the result is indicated as "slightly poor", and, if the coating was removed in an amount corresponding to 0 to 1 square, the result is indicated as "good".

The crack resistance was tested as follows, using inorganic boards each in the form of a 30 cm square block as test samples. A cycle of covering an edge of each test sample in water for 4 hours, placing the test sample for 4 hours in a sealed container filled with carbon dioxide, and then drying the test sample at 80° C. for 16 hours was repeated 10 times, after which the status of the test sample was checked. If the number of cracks observed at the edge (the side that had been covered in water) of the test sample is 4 or greater, the result is indicated as "poor", if the number of cracks observed is 2 or 3, the result is indicated as "slightly poor", and, if the number of cracks observed is 0 or 1, the result is indicated as "good".

The shrinkage during combustion was tested as follows, using inorganic boards each having a size of 7×20 cm. After the test samples were dried in a drier at 120° C. for 24 hours and then cooled in a desiccator to approximately room temperature, the length of each test sample (taken as $l_3$) was measured. Then, after the test samples were loaded in a furnace at 900° C. for 20 minutes and then cooled in the desiccator again to approximately room temperature, the length of each test sample (taken as $l_4$) was measured. Then, $(l_3-l_4)$ was divided by $l_3$ and then multiplied by 100, and the obtained value was evaluated. If the obtained value is greater than 5, the result is indicated as "poor", if the obtained value is 4 to 5, the result is indicated as "slightly poor", and, if the obtained value is less than 4, the result is indicated as "good".

The inorganic board of Comparative Example 1 not containing wollastonite had a low flexural strength of 11.2 N/mm$^2$, and was poor in dimensional stability and shrinkage during combustion. Also, the inorganic board of Comparative Example 2 containing wollastonite having a wet volume (after being allowed to stand for 30 minutes) of 10 ml had a low flexural strength of 11.5 N/mm$^2$, and was poor in dimensional stability and shrinkage during combustion. Furthermore, the inorganic board of Comparative Example 3 containing 35 mass % (solid content ratio) of wollastonite having a wet volume (after being allowed to stand for 30 minutes) of 30 ml had a very low flexural strength of 7.5 N/mm$^2$, and was poor in dimensional stability.

On the other hand, all of the inorganic boards of Examples 1 to 5 had a flexural strength of more than 12 N/mm$^2$, and were excellent in productivity, dimensional stability, coating adhesion, crack resistance, and shrinkage during combustion.

Although an embodiment of the present invention was described in the description above, the present invention is not limited thereto. Various modifications are possible within the scope of the present invention defined by the claims.

As described above, the present invention can provide an inorganic board that is excellent in crack resistance, fire resistance, dimensional stability, and productivity, and a method for manufacturing the inorganic board.

What is claimed is:

1. An inorganic board, comprising, in a solid content ratio, 30 to 70 mass % of hydraulic material, 5 to 15 mass % of reinforcing fiber, and 1 to 30 mass % of wollastonite having a wet volume (after being allowed to stand for 30 minutes) of 15 to 45 ml.

2. The inorganic board according to claim 1, wherein the wollastonite has a difference between a wet volume (after being allowed to stand for 15 minutes) and a wet volume (after being allowed to stand for 30 minutes) of less than 10%.

3. The inorganic board according to claim 1, which is a cured mat obtained by dehydrating a slurry.

4. The inorganic board according to claim 1, further comprising 18 to 64 mass % of inorganic admixture.

5. The inorganic board according to claim 4,
wherein at least one of mica, pearlite, coal ash, paper sludge ash, and magnesium hydroxide is contained as the inorganic admixture, and
at least one of waste paper and pulp is contained as the reinforcing fiber.

6. A method for manufacturing an inorganic board, comprising:
a step of producing a slurry containing a hydraulic material, a reinforcing fiber, and wollastonite;
a step of producing a sheet by dehydrating the obtained slurry; and
a step of pressing and curing the obtained sheet;
wherein, in the step of producing a slurry, a composition of the slurry is set so as to contain, in a solid content ratio, 30 to 70 mass % of hydraulic material, 5 to 15 mass % of reinforcing fiber, and 1 to 30 mass % of wollastonite having a wet volume (after being allowed to stand for 30 minutes) of 15 to 45 ml.

7. The method for manufacturing an inorganic board according to claim 6, wherein, in the step of producing a slurry, wollastonite having a difference between a wet volume (after being allowed to stand for 15 minutes) and a wet volume (after being allowed to stand for 30 minutes) of less than 10% is used.

8. The method for manufacturing an inorganic board according to claim 6, wherein, in the step of producing a slurry, the slurry is produced so as to further contain 18 to 64 mass % of inorganic admixture in a solid content ratio.

9. The method for manufacturing an inorganic board according to claim 8, wherein, in the step of producing a slurry, at least one of mica, pearlite, coal ash, paper sludge ash, and magnesium hydroxide is used as the inorganic admixture, and at least one of waste paper and pulp is used as the reinforcing fiber.

* * * * *